UNITED STATES PATENT OFFICE.

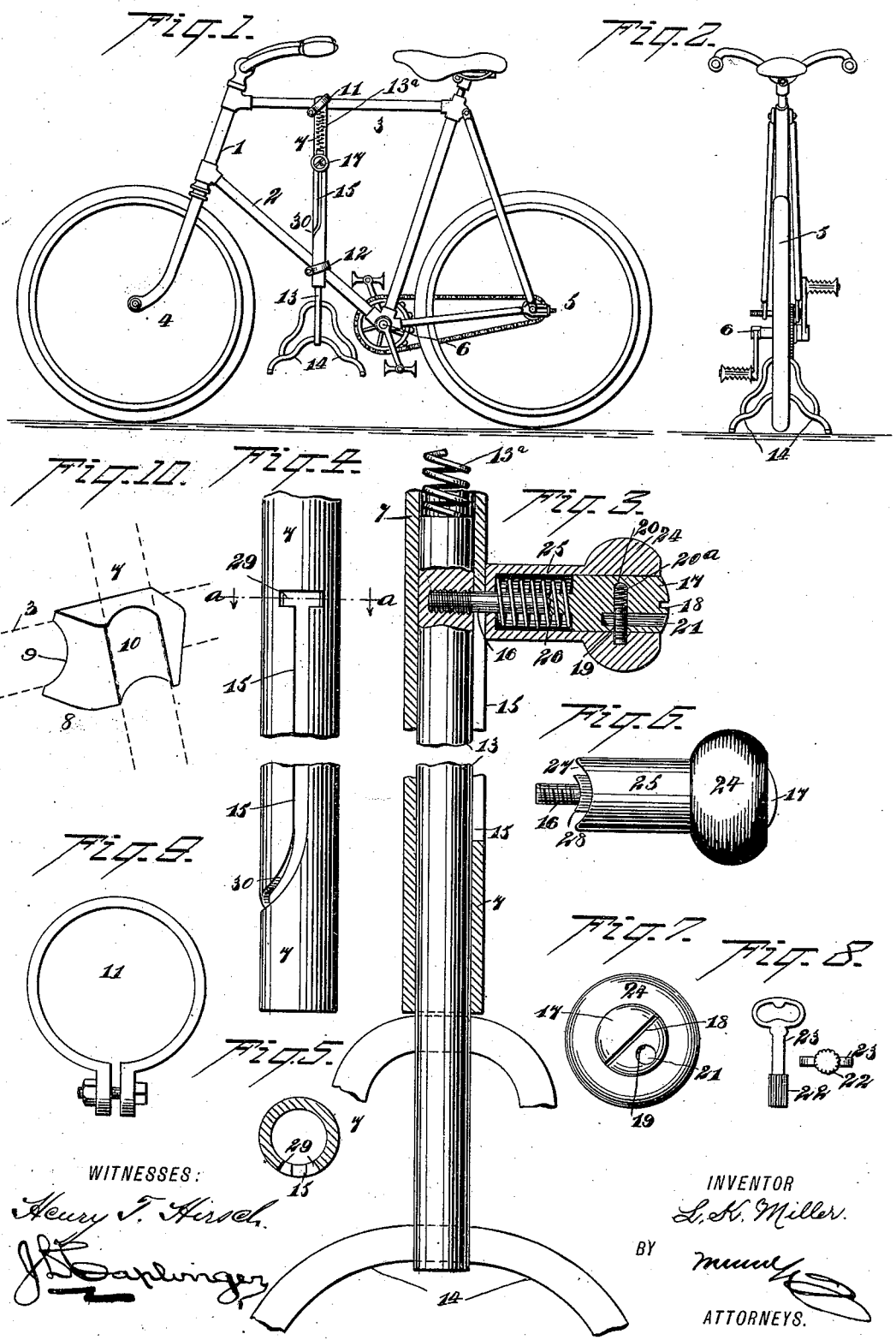

LEWIS K. MILLER, OF CLARKSBURG, MISSOURI.

BICYCLE-HOLDER.

SPECIFICATION forming part of Letters Patent No. 574,253, dated December 29, 1896.

Application filed April 16, 1896. Serial No. 587,852. (No model.)

*To all whom it may concern:*

Be it known that I, LEWIS K. MILLER, of Clarksburg, in the county of Moniteau and State of Missouri, have invented a new and Improved Bicycle-Holder, of which the following is a full, clear, and exact description.

This invention relates to certain improvements in holders for bicycles and similar vehicles, and has for its object to provide a holder of a simple and inexpensive character and of a light and compact construction adapted to be secured to the frame of the vehicle, so as to be carried thereon out of operative position and out of the way of the rider, but in position to be conveniently used whenever the rider desires to dismount.

The invention consists in a holder having feet to engage the ground on each side of the bicycle, said holder being adapted to be raised and lowered out of and into operative position and being provided with means whereby its feet are swung in line with the frame, so as not to project therefrom when the holder is raised, and are swung in the opposite direction when the holder is lowered.

The invention also contemplates certain novel features in the construction, combination, and arrangement of the various parts of the improved holder, whereby certain important advantages are attained and the device is made simpler, cheaper, and otherwise better adapted and more convenient for use than various other similar devices heretofore employed. The novel features of the invention will be carefully defined in the claim.

Reference is to be had to the accompanying drawings, forming a part of this specification, in which similar characters of reference indicate corresponding parts in all the views.

Figure 1 is a side view of a bicycle provided with a holder constructed in accordance with my invention. Fig. 2 is a rear elevation of the same. Fig. 3 is an enlarged fragmentary sectional view showing certain features of construction of the holder. Fig. 4 is a view somewhat similar to Fig. 3, but showing in elevation the sleeve wherein the stem of the holder slides. Fig. 5 is a sectional view taken through the sleeve in the plane indicated by the line $a\ a$ in Fig. 4. Fig. 6 is an enlarged side view of the locking device detached. Fig. 7 is an end view of the locking device. Fig. 8 is a view showing in side and end elevation the key for actuating the locking device. Fig. 9 is an enlarged detail view showing the clip employed for securing the sleeve wherein the stem of the holder slides in place on the frame, and Fig. 10 is a perspective view showing the block interposed between the frame and the sleeve at the points where these parts are connected together.

In the views, 1 indicates the head-bearing of the bicycle-frame. 2 indicates the diagonal lower brace-bar, and 3 the horizontal upper brace-bar, of the same. 4 indicates the steering-wheel, and 5 the driving-wheel, of the bicycle, these parts being mounted in the usual way in the frame, and the driving-wheel being actuated from a crank-shaft 6, journaled in the lower part of the frame.

7 indicates a sleeve or tube secured at its upper and lower ends to the upper and lower braces 3 and 2 of the frame. By preference bearing-blocks such as that shown in Fig. 10 and clips such as that shown in Fig. 5 are employed for securing the sleeve or tube 7 in place on the frame, the bearing-block 8 being provided on one side with a groove 9 of semicircular cross-section, adapted to receive and fit against one side of the upper brace-bar of the frame, the opposite side of said block being provided with a similar groove 10, arranged at angles to the groove 9 and adapted to receive and fit the side of the tube or sleeve 7. The clip 11 is of circular form, having its ends bent at angles and provided with a screw or bolt, and said clip is adapted to be passed around the brace-bar of the frame and the sleeve or tube 7, so as to hold these parts securely connected. A similar connection 12 is provided at the lower brace-bar 2.

In the hollow of the tube or sleeve 7 is arranged to slide the stem 13 of the holder, having at its lower end oppositely-extending feet or legs 14, as clearly shown in Figs. 1 and 2. The sleeve or tube 7 is provided at its central part with a longitudinal slot 15, preferably arranged so as to stand at one side of the tube when the same is in place on the frame, as shown in Fig. 1, and in said slot plays a screw or stem 16, having a threaded end screwing into an aperture in the stem 13, as clearly shown in Fig. 3.

The outer end 17 of the stem or screw 16 is made enlarged and is of circular form, being provided with a kerf to receive a screw-driver or equivalent tool, whereby it may be screwed into the recess of the stem, and in the enlarged portion or head of the said screw are formed passages 20 and 21, extending at right angles to each other, the intersecting passage 21 opening at the end surface of the head, while the passage 20 opens at one side thereof. In the passage 20 is arranged to slide a bolt 19, provided with a spring 20$^a$, so arranged as to cause the bolt to normally protrude from the side of the head in position to engage a socket formed in one side of the head 24 of the locking-sleeve 25, as shown in Fig. 3. A key 23 is employed for actuating the bolt 19, said key being provided with a toothed end portion 22, adapted to fit into the passage 21 in the head 17, and the teeth on said toothed portion are adapted to engage rack-teeth formed in one side of the bolt 19. In this way it will be seen that when the key is inserted in the passage 21 and turned the bolt will be moved out of engagement with the socket in the head 24 of the locking-sleeve, so as to permit said sleeve to be moved longitudinally upon the screw or pin 16.

The sleeve 25 is formed with a recess of a diameter corresponding to the diameter of the head 17 of the screw or bolt 16, but of considerably greater length than said head, and in said recess between the closed end of the sleeve and the head 17 is arranged a spring 26, coiled on the reduced portion of the screw 16 and serving, when the screw is in place in the recess in the stem 13, to press the locking-sleeve 25 against the side of the sleeve or tube 7. The end surface 27 of the locking-sleeve 25 is made curved to conform to the surface of the sleeve or tube 7, and on said curved surface is formed a lug or projection 28, adapted to engage an aperture 29 at the upper end of the slot 15 in the sleeve 7, so that when the holder is raised to lift its legs 14 out of engagement with the ground said holder may be held raised by the engagement of the lug 28 with the aperture 29.

The lower end 30 of the slot 15 is curved, as clearly shown in Figs. 1 and 4, so that when the holder is lowered a partial rotation will be imparted thereto, and said lower end 30 of the slot may be also provided with a recess similar to the recess 29 at the upper end of the slot, so that the holder may be locked in its lowered position. As shown in dotted lines in Fig. 1 and in full lines in Fig. 3, a contractile spring 13$^a$ is arranged in the tube or sleeve 7, being connected at its lower end with the stem 13, so that when the holder after having been pressed down is released it will be automatically returned to its raised position, as shown in Fig. 1. Where such a device is employed, it is not absolutely necessary that the upper end of the slot 15 in the sleeve be provided with the locking-aperture 29.

As shown in Fig. 1, the legs or feet 14 of the holder are arranged, when the holder is in its raised position, as shown in said figure, to stand parallel with the lower brace-bar 2 of the frame, so as not to project beyond the sides of the frame in the way of the rider; but when the holder is lowered the engagement of the pin or screw 16 with the lower curved portion 30 of the slot 15 will act to rotate the holder, so as to cause said feet or legs 14 to project beyond opposite sides of the frame to hold the vehicle in an erect position.

From the above description it will be seen that the device is of an extremely simple and inexpensive construction and is especially well adapted for the purposes for which it is designed, since it permits of being attached to the frame in such a position as to be out of the way of the rider when the machine is in motion and can be readily and conveniently manipulated to support the machine whenever desired. It will also be obvious that the invention is susceptible of some modification without material departure from its principles and spirit, and for this reason I do not wish to be understood as limiting myself to the precise form and arrangement of the parts herein set forth.

Having thus described my invention, I claim as new and desire to secure by Letters Patent—

In a bicycle-holder, the combination of a slotted sleeve, a stem arranged to slide in the sleeve and having a pin projecting through the slot thereof, and provided with a head, a locking-sleeve mounted to slide on the pin and having a recess to receive the head thereof, a spring to hold the locking-sleeve normally engaged with the side of the main sleeve to lock the stem in adjusted position, and a bolt carried by the head of the pin to engage the said locking-sleeve and hold the stem against movement, substantially as set forth.

LEWIS K. MILLER.

Witnesses:
T. MOORE,
R. E. MOORE.